_United States Patent Office_ 3,095,980
Patented July 2, 1963

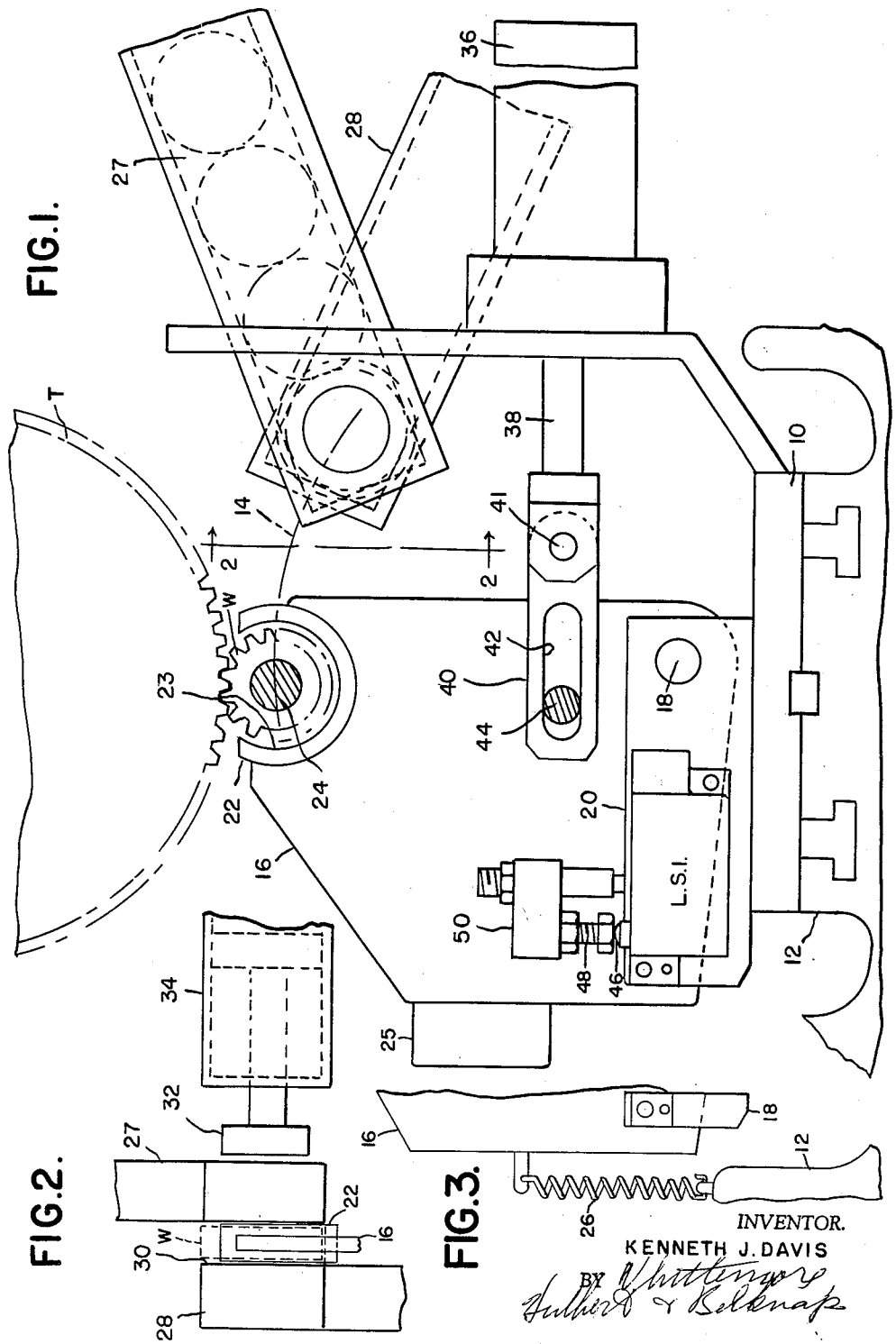

3,095,980
AUTOMATIC LOADER
Kenneth J. Davis, Detroit, Mich., assignor to National Broach & Machine Company, Detroit, Mich., a corporation of Michigan
Filed Mar. 9, 1959, Ser. No. 798,076
13 Claims. (Cl. 214—1)

The present invention relates to an automatic loader and more particularly to an automatic loader designed to effect movement of work gears into mesh with a gear-like finishing tool.

It is an object of the present invention to provide an automatic loader characterized by its smooth action which prevents jamming of a gear and gear-like tool in the event the gear and tool fail to mesh on initial contact.

It is a feature of the present invention to provide an automatic loader for a gear finishing machine including a movable carrier including means for supporting a gear, and non-positive actuating means to move said carrier toward a gear-like tool so that movement of the carrier is arrested if the gear and tool fail to mesh.

It is a further feature of the present invention to provide a pivoted carrier including means for supporting a work gear and for transporting the work gear between a loading and unloading station and a working station, and non-positive means such as gravity operated means or resilient means effective to move the carrier in a direction to cause a work gear carried thereby to approach a gear-like tool.

It is a further feature of the present invention to provide an automatic loader as described in the preceding paragraph in combination with motor means for effecting movement of the carrier in a direction to move a work gear from the working station to the loading and unloading station.

Other objects and features of the invention will become apparent as the description proceeds, especially when taken in conjunction with the accompanying drawing, illustrating a preferred embodiment of the invention, wherein:

FIGURE 1 is a diagrammatic elevational view of the automatic loader.

FIGURE 2 is a fragmentary elevational view looking in the direction of the arrows 2—2, FIGURE 1.

FIGURE 3 is a fragmentary elevational view showing a modified form of the invention.

The automatic loader is designed for use with a gear finishing machine which may be a gear shaving machine, a honing machine, a gear lapping machine, or other type of machine in which a work gear is positioned in mesh with a gear-like tool. Normally, the gear and gear-like tool are meshed with their axes crossed at a small angle, as for example between 3 and 30 degrees. Either the gear member or tool member is positively driven in rotation and drives the other member through the meshed engagement therebetween. Working pressure between the teeth of the gear and tool may be provided by opposing rotation of the driven member, by yieldably urging the gear and tool toward each other generally radially thereof, or by moving the members into tight mesh or a cramped condition and rigidly supporting them in this position while driving them in rotation. A gear finishing machine of the type referred to is disclosed in Drummond Patent 2,270,422 and details of the machine are accordingly not disclosed herein.

Referring to the drawings the automatic gear loader is mounted on a plate 10 carried by the table 12 of the gear finishing machine. Suitable means are provided, as disclosed in the prior Drummond patent referred to above, for effecting vertical movement of the table and horizontal traverse of the table. The gear finishing machine includes an overhanging head which supports a gear-like tool T in the form of a gear conjugate to a work gear W. The head of the gear finishing machine includes means for driving the tool T in rotation. It will of course be understood that where the gear and tool are operated in mesh at crossed axes, the tool T will have its teeth of a helix angle so that it meshes properly with the teeth of the gear while the axes of the tool and gear are crossed in space.

Automatic loading equipment suitable for use with a gear finishing machine must be designed to take care of the possibility that the gear and tool will fail to mesh when brought into initial contact with each other. In accordance with the present invention means are provided for supporting a work gear W with freedom of rotation and for transporting the gear bodily toward the tool T along a path tangentially related to the tool. As disclosed herein, the axis of the work gear moves along the arcuate path 14 which causes a peripheral portion of the work gear W to move tangentially to the periphery of the tool T as clearly shown in FIGURE 1.

To effect the required movement of the work gear W the loader comprises a carrier 16 which is pivoted at 18 to mounting brackets 20 carried by the plate 10. The carrier includes a gear support 22 of partly cylindrical shape having an arcuate extent in excess of 180 degrees and having an opening 23 adapted to receive work gears. Means subsequently to be described are effective to insert a work gear to be finished into the opening 23 and for ejecting a finished work gear therefrom. The support 22 has an internal diameter somewhat greater than the outside diameter of the work gear so that when a work gear is moved into the working station and engaged by centers (one of which is indicated at 24) of the gear finishing machine, it is moved into clearance with respect to the support 22.

The carrier 16 has associated therewith non-positive means effective to move the carrier in a direction to cause the gear support 22 to move from a loading and unloading station to the working station adjacent the tool T. This non-positive means may be a counterweight such as indicated at 25 in FIGURE 1, or if desired, a spring as indicated in dotted lines at 26 in FIGURE 3 may be substituted therefor. In any case, the only force acting upon the carrier 16 to cause movement in a direction to bring a work gear W into mesh with the tool T is the non-positive means such as the counterweight 25 or spring 26 substituted for the counterweight.

After the work gear has been finished, means are provided for moving the carrier in a direction to cause the finished work gear W to move from the working position in which it is in mesh with the tool T to the loading and unloading station. This last station is determined by the intersection between a supply chute 27 and a discharge chute 28 which are spaced apart laterally, as best illustrated in FIGURE 2. The carrier 16 and particularly the gear support 22, is of a transverse dimension such that it moves into the space 30 intermediate the chutes 27 and 28 with the arcuate opening therein in alignment with both the supply chute and the discharge chute. At this time a plunger 32 of a loading cylinder 34 is operated and is effective to advance an unfinished work gear out of the lower end of the supply chute 27 into the arcuate opening 23 of the support 22. Movement of the unfinished gear W into the support 22 causes it to push the previously finished work gear out of the support and into the discharge chute 28 where it rolls by gravity to a suitable collection or gauging point.

Movement of the carrier 16 in a direction to cause the gear support to move a finished gear from the working station to the loading and unloading station is accomplished by means of a return cylinder 36 having a piston therein connected to a piston rod 38 which in turn carries a connector 40 pivoted to the piston rod 38 at 41 and provided with an elongated slot 42 which receives a pin 44 mounted on the carrier 16. Due to the provision of the elongated slot 42 it will be apparent that the return cylinder 36 is effective to apply force to the carrier 16 acting only in a direction to cause return movement of the carrier 16 to the loading and unloading station. Movement of the work gear into contact with and then into meshed engagement with a tool T is effected solely by gravity where the counterweight 25 is employed, or relatively light spring pressure where this is substituted for the counterweight. However, it will be observed that the rate of movement of the work gear W as it moves towards meshed engagement with the tool T is determined by the rate of operation of the piston and cylinder device 36. In other words, the connector 40 releases the carrier 16 at a controlled rate for movement under a force dependent on the counterweight 25 or spring 26. Thus, if the work gear W fails to mesh with the tool T upon initial contact therebetween, the connector 40 moves ahead without applying any force tending to jam the work gear W and tool T.

Mounted on the bracket 20 is a limit switch LS1 having a plunger 46 engageable by an adjustable switch adaptor 48 carried by a bracket 50 secured to the carrier 16. The gear finishing machine to which the automatic loader is applied includes automatic control equipment and initiation of a gear finishing cycle is dependent upon actuation of the limit switch LS1. It will be apparent that if a work gear W engages the periphery of a tool T and fails to mesh therewith, the carrier 16 will be prevented from moving into the position illustrated in FIGURE 1, and accordingly, actuation of the limit switch LS1 does not occur.

The drawing and the foregoing specification constitute a description of the improved automatic loader in such full, clear, concise and exact terms as to enable any person skilled in the art to practice the invention, the scope of which is indicated by the appended claims.

What I claim as my invention is:

1. An automatic loader for a gear finishing machine comprising a carrier having a gear support thereon arranged to support a work gear for rotation and movable between two positions along a path substantially tangential to the periphery of a work gear, one position providing a combined loading and unloading station and the other position providing a working station, non-positive means acting on said carrier in a direction to move said support from the combined loading and unloading station to the working station, and power means movable in opposite directions at controlled predetermined speeds and having a one-way connection to the carrier and operable upon movement of said power means in one direction to effect positive movement of the carrier in a direction to move the gear support from the working station to the combined loading and unloading station, movement of said power means in the opposite direction being operable to release said carrier at a controlled rate for movement by said non-positive means in the direction to move the gear support toward the said working station.

2. A gear loader as defined in claim 1 in which the non-positive means comprises a counterweight.

3. A gear loader as defined in claim 1 in which the non-positive means comprises a spring.

4. A loader as defined in claim 1 in which the power means comprises means providing a pin and slot connection to the carrier.

5. A gear loader for moving a work gear into mesh at a working station with a gear-like finishing tool comprising a pivoted carrier having a gear support arranged to support a work gear for rotation and thereon movable between a first position providing a combined loading and unloading station and a second position providing a working station in which a work gear is in mesh with a gear-like tool, power means movable in opposite directions at controlled predetermined speeds and having a one-way connection with said carrier and operable upon movement of said power means in one direction to effect positive movement of said carrier in a direction to move said gear support from said combined working station to said loading and unloading station, and non-positive means operatively connected to said carrier effective to urge said carrier in a direction to move said gear support from said combined loading and unloading station to said working station, movement of said power means in the opposite direction being operable to release said carrier at a controlled rate for movement by said non-positive means in the direction to move the gear support toward the said working station.

6. A loader as defined in claim 5 in which said non-positive means comprises a counterweight.

7. A loader as defined in claim 5 in which said non-positive means comprises a spring.

8. A loader as defined in claim 5 in which said power means comprises a piston and cylinder device, and a pin and slot connection between said device and said carrier.

9. An automatic loader for a gear finishing machine effective to receive a work gear from a supply chute to move the work gear from the supply chute into mesh with a gear-like tool to move the finished gear to a discharge chute and to unload the finished gear into the discharge chute, comprising inclined laterally spaced supply and discharge chutes, a carrier having a gear support thereon arranged to support a work gear for rotation and movable into position between said chutes in alignment with both of said chutes, means for shifting a work gear laterally out of the supply chute into said support and thereby displacing a finished gear from said support into said discharge chute, non-positive means operatively connected to said carrier and effective to apply a force to said carrier to move said support only in a direction from said chutes to a working station adjacent the periphery of a gear-like tool, and power means movable in opposite directions at controlled predetermined speeds and having a one-way connection with said carrier and operable upon movement of said power means in one direction to effect positive movement of said carrier in a direction to move said support from said working station to a position between said chutes, movement of said power means in the opposite direction being operable to release said carrier at a controlled rate for movement by said non-positive means in the direction to move the gear support toward the said working station.

10. A loader as defined in claim 9 in which said non-positive means comprises a counterweight.

11. A loader as defined in claim 9 in which said non-positive means comprises a spring.

12. A loader as defined in claim 9 in which said power means comprises a piston and cylinder device having a one-way connection to said carrier and effective to move said carrier in a direction to move the gear support from the working station to the position intermediate said chutes and operable when actuated in the opposite direction to effect a controlled movement of said carrier to cause the gear support to move from the piston intermediate the chutes into the working station at a rate determined by the rate of operation of said piston and cylinder device.

13. An automatic loading fixture for a gear finishing machine of the type having a gear-like finishing tool, means for driving said tool, and a rotary work support including means for engaging a work gear when said gear is in meshed relation with the gear-like tool, said fixture comprising a carrier having a gear support thereon movable back and forth between two limiting positions along a path substantially tangential to the periphery of the gear-like finishing tool, one of said positions providing a combined loading and unloading station and the other position providing a working station, non-positive means including a counterweight acting on said carrier in a direction to move said support from the combined loading and unloading station to the working station, and power means movable in opposite directions at controlled predetermined speeds and having a one-way pin and slot connection to the carrier, with the connection operable upon movement of said power means in one direction to effect positive movement of said carrier in a direction to move the gear support from the working station to the combined loading and unloading station, movement of said power means in the opposite direction being operable to release said carrier at a controlled rate for movement by said non-positive means in the direction to move the gear support toward said working station.

References Cited in the file of this patent

UNITED STATES PATENTS

| | | |
|---|---|---|
| 1,362,286 | Gerhardt | Dec. 14, 1920 |
| 1,514,207 | Gory | Nov. 4, 1924 |
| 2,011,627 | Graham | Aug. 20, 1935 |
| 2,184,519 | Eppensteiner | Dec. 26, 1939 |
| 2,245,841 | Weiss | June 17, 1941 |
| 2,692,535 | Praeg | Oct. 26, 1954 |
| 2,876,325 | Baffrey | Mar. 3, 1959 |
| 2,978,117 | Thompson | Apr. 4, 1961 |